Nov. 29, 1955     Y. T. SIHVONEN     2,725,501
COMBUSTION CHAMBER PRESSURE INDICATOR
Filed July 27, 1954
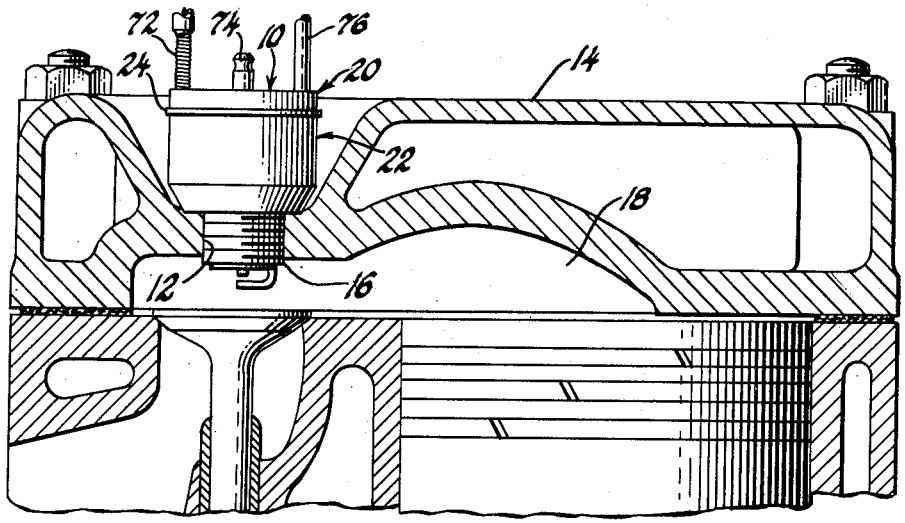
Fig. 1
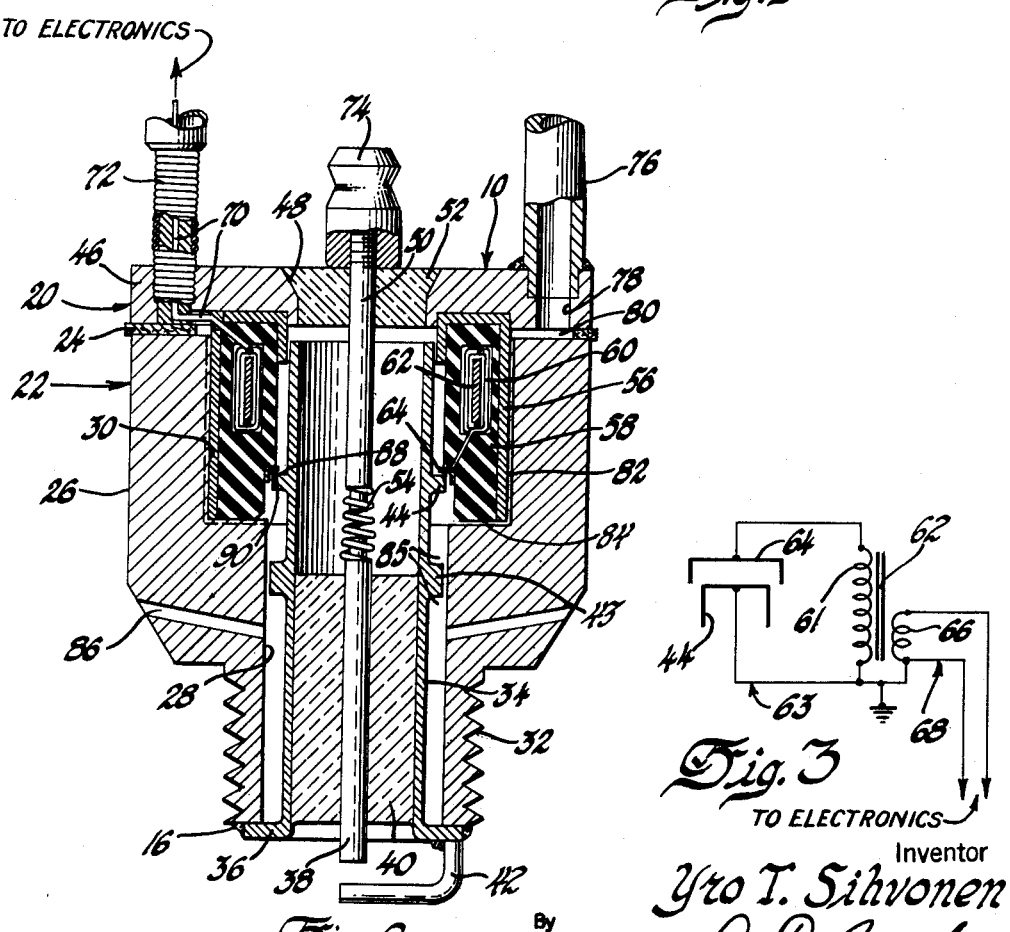
Fig. 2
Fig. 3
Inventor
Yro T. Sihvonen
L. D. Burch
Attorney United States Patent Office 2,725,501
Patented Nov. 29, 1955

2,725,501

COMBUSTION CHAMBER PRESSURE INDICATOR

Yro T. Sihvonen, Birmingham, Mich., assignor to General Motors Corporation, Detroit, Mich., a corporation of Delaware Application July 27, 1954, Serial No. 445,994

10 Claims. (Cl. 315—58)

This invention relates to capacitor type spark plug engine pressure indicators, and particularly to devices of this kind in which additive capacitance changes are produced which increase the signal-noise ratio and thus increase the accuracy of the device.

In analyzing the operation of internal combustion engines it is very important to be able to determine the pressures and the variations thereof occurring in the combustion chambers. Devices adapted to both fire the engine and determine such pressures and presusre changes have been developed. Such devices may be inserted into the spark plug opening of one of the cylinders so that that particular cylinder may be fired along with the rest of the cylinders in the engine and at the same time the pressure changes in that particular cylinder can be determined.

There are objections however to the devices presently being used. One such objection is that these devices are constructed so that it is necessary to miniaturize the spark plug electrodes thereby causing deviations from true spark plug action. The combustion processes in the combustion chambers of an engine are very complex, and it is absolutely essential for accurate results that the actual operating conditions of the engine be maintained during the testing. Further present engine indicators, whether of the strain gauge or of the capacitor type, are subject to vibrations of the engine not directly related to combustion chamber pressures so that erroneous signals may be generated. The usual capacitor type devices include spaced condenser plates with one of the plates being movable due to combustion chamber pressure changes, and the relative movement between the plates results in capacitance changes in the condenser circuit which effect the voltage conditions in the associated electronic recording instruments. Among the vibrations not directly related to combustion chamber pressures are those that cause lateral movement between the plates, as well as changes in the spacing between the plates. The lateral movement is not as serious in producing erroneous readings because as some portions of the plates move closer together to increased capacitance, other portions of the plates move farther apart to decrease capacitance resulting in self-cancellation of these undesirable capacitance changes. The change in spacing between the plates due to engine vibrations not related directly to combustion pressure changes does result in erroneous signals since the signal-noise ratio is relatively low. In other words the total signal has included in it an undesirably high percentage of signals due to these vibrations not directly related to combustion pressures since they result from the same change in spacing between the condenser plates as is produced by the combustion pressure chambers. Lastly, present pressure indicators of this type lack convenient electro-static shielding means between the spark electrode and the pressure indicating means thereof so that further errors may be introduced. Other practical disadvantages also exist, even in the devices that are adapted to both fire the engine and measure the pressure changes therein. Devices to be employed in conjunction with separate firing means are of course even more objectionable because actual combustion chamber conditions must necessarily be deviated from.

It is now proposed to provide a capacitor type spark plug engine pressure indicator for both firing and measuring the pressures and pressure changes in internal combustion engines during the operation thereof which do not have the above objections of presently used devices of this type. For instance, the proposed device is constructed so that the parts thereof are concentrically arranged and so that electro-static shielding between the spark plug electrode and the pressure measuring device is automatically accomplished without taking special steps to provide the same. This type of construction also permits the use of standard spark plug electrodes so that normal firing of the engine is accomplished. Further, and of primary importance, the pressure measuring means in the proposed structure includes a condenser having the usual movable and stationary plates, but with the stationary plate being concentrically formed to receive a portion only of the movable plate. Thus, in addition to a change in spacing between the plates, there is possible also a telescoping of the plates which produces an additional capacitance change which is additive to the capacitance change due to the change in spacing. This additional capacitance change results in a stronger total signal of which a much lesser part constitutes the result of change in spacing and telescoping between the plates not directly the result of combustion engine pressures. In other words the effect of the erroneous portion of the total signal is greatly diluted, and the signal-noise ratio is thus increased so that more accurate readings are produced.

In the drawings:

Figure 1 is a vertical cross-sectional view taken on a plane passing through the spark plug opening of a cylinder head and illustrating in elevation a preferred embodiment of a device embodying the invention.

Figure 2 is an enlarged vertical cross-sectional view with portions thereof in elevation of the firing and pressure indicating device shown by Figure 1.

Figure 3 represents a simplified wiring diagram of the condenser and coil coupling elements of the device shown by Figures 1 and 2.

Referring to the drawings in greater detail, a firing and pressure measuring device generally indicated by 10 is mounted in the spark plug opening 12 in the head 14 of an engine so that the end 16 of the device is exposed to pressures in the combustion chamber 18 just as an ordinary spark plug would be.

The device 10 comprises a cover 20 and a body 22 separated by the gasket 24. The body 22 comprises an outer shell having a bore 28, an annular recess 30 and an externally threaded free end 32 all in axial alignment with the shell 26. Disposed within the axial bore 28 is a tubular member 34 of lesser diameter than the bore having an annularly extending flange 36 at the end thereof adjacent the threaded end 32 of the outer shell 22. The flange 36 is suitably secured to the threaded end 32 of the outer shell, as by brazing or other means depending upon the temperatures to be encountered, to provide a diaphragm 36 at the end 16 of the body portion of the device. A lower portion 38 of the high voltage spark electrode is disposed axially of the tubular member 34 and insulated therefrom by the insulating material 40. The ground electrode 42 is suitably secured to the flange 36 and thus to the outer shell 26 in the engine head in any suitable manner to provide other portions of a normal spark plug. The tubular member 34 is preferably constructed from any good conductor material having a coefficient of expansion similar to that of the insulating material 40 and provides automatic electro-static shielding, though not magnetic shielding. The tubular member has a pair of annular shoulders 43 and 44 disposed thereon, with the shoulder 43 being provided to guide the movement of the tubular member 34 through the bore 28 in the outer shell when the diaphragm 36, which is exposed directly to combustion chamber pressures, is flexed so that the tubular member 34 moves up and down within the outer shell 26. The shoulder 44 constitutes the movable conductor of a condenser element provided in the device to record pressure changes.

The cover 20 of the proposed device comprises an annular ring member 46 having an aperture 48 therein for mounting the upper portion 50 of the high voltage spark electrode in the insulator 52, which may be any suitable material such as glass. A linking spring 54 is then provided to extend between and to connect the upper and lower portions 50 and 38 of the high voltage spark electrode so that spark may be maintained when the tubular member 34 moves up and down within the outer shell 26. An annular member 56, preferably made from copper or some other good conductor, is suitably formed to engage the annular insulating member 58, which, in turn, is preferably constructed from a material having a low loss factor or, in other words, a material having no effect on magnetic lines. Within the insulator 58 there is disposed a toroid coil 60 having on the core 62 windings 61 to provide a high impedance circuit 63 with the movable condenser plate 44 and the cylindrical stationary condenser plate 64, the circuit being highly sensitive to capacitance changes. The winding 66 of the toroid coil 60 provides a low impedance circuit 68 much less sensitive to capacity changes and is connected through the leads 70 disposed within the insulated and resiliently sheathed cable 72 to well-known associated electronic devices for indicating the pressure changes in the combustion chamber. The high voltage connector 74, of course connects with the lead wire from the distributor of the engine. The tube 76 is suitably brazed or otherwise connected to the cover 20 over the opening 78 in the cover to provide a continuous fluid coolant passage, together with the clearances 80, 82, 84 and 85 between the parts of the device and the passages 86 provided in the outer shell. Thus, the device may be cooled by applying fluid pressure or a vacuum at the tube 76.

In operation, the device is threaded into the spark plug opening 12 as shown in Figure 1 and the normal compression of the fuel charge and the ignition thereof takes place in the engine. The combustion chamber pressures flex the diaphragm 36 so that the tubular member 34 moves upwardly through the outer shell 26 with increasing combustion chamber pressure. The upward movement of the tubular member 34 causes the movable plate 44 to telescope within the stationary plate 64, as well as causing the faces 88 and 90 to approach one another. This change in spacing between the faces 88 and 90 causes a capacitance change to occur in the high impedance circuit 63 of the toroid coil 60 which is reflected through the low impedance windings of the winding 66 of the toroid coil 60 and which may be transformed into a voltage by the associated electronics indicating devices. Movement of the movable plate in the opposite direction causes the opposite capacitance changes. This change in spacing is also caused by vibrations of the engine not related to combustion chamber pressures, but to a lesser extent so that a greater part of the total signal is related to such pressures. It will be noted that certain engine vibrations not related to combustion chamber pressures may also cause the tubular member 34 and thus the movable plate 44 to move laterally within the fixed plate 64 so that the two approach one another on one side thereof and move farther apart on the opposite side thereof. Again capacitance changes occur, but this error is roughly self-cancelling since the capacitance increase due to approach-ing of the parts is cancelled by the capacitance decrease due to the moving apart of these parts.

To this point, the operation of the device is similar to that of known devices of this kind. However, since the movable plate 44 may telescope with the fixed plate 64, an additional capacitance change occurs which change is additive with the capacitance change due to the changes in spacing between the two plates. Since this approximately doubles the total signal, while the erroneous signal increases only slightly, the signal-noise ratio is improved.

It will be apparent from the above description and drawings that there has been provided a device such as that described which, in addition to having a pressure indicating mechanism which is more accurate, is capable of inexpensive and simple construction and has the feature of concentricity between the various parts thereof to enable the structure to approach that of an actual spark plug, to permit the efficient cooling of the parts thereof and to facilitate the provision of electro-static shielding.

What is claimed is:

1. A combination igniter and pressure indicator comprising a spark plug having an outer shell adapted for insertion in the cylinder head of an internal combustion engine, said shell defining a bore extending therethrough adapted for receiving a tubular member therein, said tubular member receiving axially thereof a high potential electrode for said spark plug with said electrode being insulated from said tubular member and said tubular member having formed around the periphery thereof a radially extending flange providing a movable conductor plate, said movable conductor plate being linked mechanically through said tubular member to a deformable diaphragm provided by an annular flange at the free end of said tubular member adjacent the end of said outer shell of said spark plug adapted for insertion in said cylinder head, said spark plug having a stationary conductor plate spaced from said movable plate and being flanged to receive a portion only of said movable conductor plate, said movable and said stationary conductor plates through the motion of said diaphragm producing a first capacity change due to a variation in spacing between and a second capacity change due to a telescoping of said plates, said capacity changes being additive and thus minimizing the effect of capacity changes due to relative movement between said plates due to engine vibrations not directly related to combustion chamber pressures.

2. A combination igniter and pressure indicator device comprising a spark plug having an outer shell adapted for insertion in the spark plug opening in the cylinder head of an internal combustion engine, said outer shell defining a bore extending therethrough adapted for receiving a tubular member therein, said tubular member receiving axially thereof a high potential electrode for said spark plug with said electrode being insulated from said tubular member, said tubular member having formed thereon a flange providing a movable conductor plate, said movable conductor plate being mechanically linked through said tubular member to a deformable diaphragm provided by a flange at the free end of said tubular member adjacent the end of said outer shell of said spark plug adapted for insertion in said cylinder head, said spark plug having a stationary conductor plate spaced from said movable plate and being flanged to receive a portion only of said movable conductor plate, said movable and said stationary conductor plates through the motion of said diaphragm producing a first capacity change due to a variation in spacing between and a second capacity change due to a telescoping of said plates, said capacity changes being additive and thus minimizing the effect of capacity changes due to motions of said movable plate not related to combustion chamber pressures.

3. A combination igniter and pressure indicator unit comprising a spark plug having a diaphragm at the combustion chamber end thereof sensitive to pressure changes in said combustion chamber, said diaphragm being linked mechanically to a movable condenser plate being spaced axially and only in part peripherally from a stationary condenser plate to provide in effect a pair of condensers adapted to additively reflect capacitance changes in a manner to minimize the effect of capacitance changes due to movement between said plates not directly related to combustion chamber pressures.

4. A combination igniter and pressure indicator unit comprising a spark plug having a diaphragm at the combustion chamber end thereof flexed by pressure changes in said combustion chamber, said diaphragm being linked mechanically to a movable condenser plate being spaced axially from and telescoped only in part peripherally within a stationary condenser plate to provide in effect a pair of condensers in parallel adapted to additively reflect capacitance changes.

5. A device for both igniting a fuel mixture in a combustion chamber and measuring pressure changes therein, said device comprising a spark plug having most of the important elements thereof in concentric relation to one another, said elements including a cylindrical stationary conductor and an annular movable conductor received axially only in part by said cylindrical fixed conductor, said conductors being thus formed to provide in effect a pair of condensers reflecting capacitance changes arising from all relative movement between said conductors including the telescoping of said conductors, said arrangement of said conductors resulting in an increased signal-noise ratio and minimizing the error in pressure indication due to movement between said conductors due to vibrations in said engine not related to combustion pressures.

6. A device for both igniting a fuel mixture in a combustion chamber and measuring pressure changes therein, said device comprising a spark plug having most of the important elements thereof in concentric relation to one another, said elements including a dished stationary conductor and an annular movable conductor received axially only in part by said dished fixed conductor, said conductors being thus formed to provide in effect a pair of condensers reflecting capacitance changes arising from all relative movement between said conductors including the telescoping of said conductors, said arrangement of said conductors resulting in an increased signal-noise ratio and minimizing the error in pressure indication due to movement between said conductors due to vibrations in said engine not related to combustion pressures.

7. A unit for both igniting a fuel mixture in a combustion chamber and measuring pressure changes therein, said unit having most of the important elements thereof in concentric relation to one another, said elements including a stationary conductor and a movable conductor received axially only in part by said fixed conductor, said conductors being thus formed to provide in effect a pair of condensers in parallel, said pair of condensers additively reflecting capacitance changes arising from all relative movement between said conductors including the telescoping of said conductors, said arrangement of said conductors increasing the signal-noise ratio and minimizing the error in pressure indication due to movement between said conductors caused by vibrations not related to combustion pressures.

8. A unit for both igniting a fuel mixture in a combustion chamber and measuring pressure changes therein, said unit having most of the important elements thereof in concentric relation to one another, said elements including a stationary conductor and a movable conductor, one of said conductors being received axially only in part by the other of said conductors, said conductors being thus formed to provide in effect a pair of condensers in parallel additively reflecting capacitance changes arising from all relative movement between said conductors including the telescoping of said conductors, said arrangement of said conductors increasing the signal-noise ratio and minimizing the error in pressure indication due to movement between said conductors caused by vibrations in said engine not related to combustion pressures.

9. A capacitor type spark plug indicator for igniting gasoline air mixturs in the combustion chambers of internal combustion engines and for transducing the capacity changes that result from pressure changes in said combustion chambers into voltages which can be read on associated electrical instruments, the pressure sensing element of said device being based on the principle of capacitance changes that occur between a stationary conductor and a moving conductor, the latter being linked mechanically to a diaphragm on said device that is directly exposed to combustion processes, said movable and said stationary conductors in said device being formed in a manner to provide in effect two condensers in parallel reflecting additively the capacitance changes resulting from both the change in spacing between and the telescoping of said conductors and to thus minimize false signals generated by motion between the conductors not the direct result of combustion chamber pressures by increasing the signal-noise ratio.

10. A single device for both igniting the compressed charge in the combustion chamber of internal combustion engines and measuring the resultant pressure variations in said combustion chamber, the pressure measuring means in said device including a deformable diaphragm disposed normal to the axis of said device, said diaphragm being linked mechanically to the movable plate of a condenser element and having a fixed plate parallel to said movable plate and disposed normal to the axis of said device, said fixed plate having a cylindrical portion thereof having a common axis with said device and receiving a portion only of said movable plate, said fixed and movable plates of said condenser element providing in effect a condenser being sensitive to and producing capacitance changes produced by axial, lateral and telescoping movement between said plates of said condenser element, said capacitance changes due to said axial and telescoping movement between said plates related directly to combustion chamber pressures being additive to minimize the false pressure change signals generated by lesser but similar movements between said plates not related directly to combustion chamber pressures.

No references cited.